(12) United States Patent  
Saito et al.

(10) Patent No.: US 10,638,740 B2  
(45) Date of Patent: May 5, 2020

(54) GEAR MOUNTING STRUCTURE OF FISHING REEL

(71) Applicant: Shimano Inc., Sakai, Osaka (JP)

(72) Inventors: Kei Saito, Osaka (JP); Tsutomu Takada, Osaka (JP)

(73) Assignee: Shimano Inc., Osaka (JP)

( * ) Notice: Subject to any disclaimer, the term of this patent is extended or adjusted under 35 U.S.C. 154(b) by 317 days.

(21) Appl. No.: 15/688,265

(22) Filed: Aug. 28, 2017

(65) Prior Publication Data

US 2018/0146652 A1    May 31, 2018

(30) Foreign Application Priority Data

Nov. 29, 2016  (JP) ................................ 2016-231003

(51) Int. Cl.
```
A01K 89/01     (2006.01)
A01K 89/015    (2006.01)
A01K 89/00     (2006.01)
A01K 89/027    (2006.01)
F16H 25/12     (2006.01)
F16H 53/08     (2006.01)
F16H 57/00     (2012.01)
```

(52) U.S. Cl.  
CPC ...... *A01K 89/01081* (2015.05); *A01K 89/006* (2013.01); *A01K 89/01142* (2015.05); *A01K 89/01143* (2015.05); *A01K 89/01917* (2015.05); *A01K 89/027* (2013.01); *F16H 25/12* (2013.01); *F16H 53/08* (2013.01); *F16H 57/0025* (2013.01)

(58) Field of Classification Search  
CPC ............. F16B 21/186; A01K 89/01081; F16H 57/0025  
See application file for complete search history.

(56) References Cited

U.S. PATENT DOCUMENTS 2,687,855 A * 8/1954 Shakespeare ...... A01K 89/0114  
242/230  
2,711,045 A * 6/1955 Novack ................ A01K 87/007  
43/20

(Continued)

FOREIGN PATENT DOCUMENTS

JP           5777873 B2    7/2015

OTHER PUBLICATIONS

European Search Report of corresponding EP Application No. 17 19 4898.7 dated May 4, 2018.

*Primary Examiner* — Terence Boes  
(74) *Attorney, Agent, or Firm* — Global IP Counselors, LLP (57) ABSTRACT

A gear mounting structure includes a worm shaft, a gear, and an elastic member. The worm shaft includes a shaft body, on the outer surface of which is formed intersecting spiral grooves, and a gear locking portion with a non-circular cross section, on at least a portion of the outer surface of which is formed a curved surface portion and a planar portion. The gear includes a gear body, on the outer surface of which are formed teeth, and to which the handle rotation is transmitted, and a boss portion protruding from the gear body and having an engagement portion engaging the gear locking portion. The elastic member is mounted so as to abut the outer surface of the boss portion of the gear, and at least a portion of the curved surface portion of the gear locking portion.

5 Claims, 8 Drawing Sheets

(56) References Cited

U.S. PATENT DOCUMENTS

| | | | | |
|---|---|---|---|---|
| 3,709,530 A | * | 1/1973 | Redding | F16D 1/06 403/360 |
| 3,830,577 A | * | 8/1974 | Rampe | F16D 1/072 403/378 |
| 4,337,614 A | * | 7/1982 | Briscoe | F16G 15/06 411/518 |
| 4,506,559 A | * | 3/1985 | Francke | F16H 55/12 29/892.1 |
| 4,603,597 A | * | 8/1986 | Onorati | F16D 1/06 403/326 |
| 5,052,842 A | * | 10/1991 | Janatka | F16D 1/072 403/14 |
| 6,789,445 B1 | * | 9/2004 | Todd | F16B 21/186 301/124.1 |
| 7,524,132 B2 | * | 4/2009 | Horen | F16D 1/0847 403/354 |
| 2007/0182727 A1 | | 8/2007 | Kitajima | |
| 2015/0048192 A1 | | 2/2015 | Matsuo et al. | |
| 2016/0169368 A1 | * | 6/2016 | Mao | F16H 57/039 74/425 |
| 2019/0093700 A1 | * | 3/2019 | Dubberly | F16B 43/005 |

* cited by examiner

GEAR MOUNTING STRUCTURE OF FISHING REEL

CROSS-REFERENCE TO RELATED APPLICATIONS

This application claims priority to Japanese Patent Application No. 2016-231003, filed on Nov. 29, 2016. The entire disclosure of Japanese Patent Application No. 2016-231003 is hereby incorporated herein by reference.

BACKGROUND

Field of the Invention

The present invention relates to a gear mounting structure, in particular to a gear mounting structure used in a reciprocating mechanism of a fishing reel, and to which rotation of a handle is transmitted.

Description of Art

A reciprocating mechanism for evenly winding a fishing line onto a spool in accordance with the rotation of a handle is provided for a fishing reel. For example, an oscillating mechanism, which is a reciprocating mechanism of a spinning reel, comprises a gear that meshes with a pinion gear, and a worm shaft to which the gear is integrally and rotatably connected. (For example refer to Japanese Patent No. 5777873). Further, a level winding mechanism, which is a reciprocating mechanism for a dual-bearing reel, comprises a gear that meshes with a main gear, and a traverse camshaft to which the gear is integrally and rotatably connected.

In the gear mounting structure of Japanese Patent No. 5777873, a pair of slots are formed in the worm shaft engaging a planar portion of a boss portion of the gear to connect the gear and the worm shaft so as to be integrally rotatable. Even if the gap between the slots and the planar portion could be reduced in size, backlash still occurs due to a slight gap between the planar portion and the slot portion. If backlash occurs between the gear and the worm shaft, problems, such as deterioration of the rotational feel, noise, etc., can occur.

SUMMARY

An object of the present invention is to improve the rotational feel and to prevent noise from occurring between the gear and the worm shaft, by suppressing backlash between the gear and the worm shaft.

The gear mounting structure according to one aspect of the present invention is used in a reciprocating mechanism for a fishing reel and rotation of the handle is transmitted thereto. This gear mounting structure comprises a worm shaft, a gear, and an elastic member. The worm shaft comprises a shaft body, on the outer surface of which is formed intersecting spiral grooves, and a gear locking portion with a non-circular cross section on at least a portion of the outer surface, on which is formed a planar engaged portion. The gear comprises a body portion, on the outer surface of which are formed teeth, and to which handle rotation is transmitted, and a boss portion protruding from the gear body having an engagement portion that engages the engaged portion of the gear locking portion. The elastic member is mounted so as to be able to abut the outer surface of the boss portion of the gear, as well as at least a portion of the gear locking portion other than the engaged portion.

In the gear mounting structure, the gear locking portion is fastened by an elastic member mounted so as to abut the outer surface of a boss portion that engages the gear locking portion, and at least a portion of the gear locking portion of the worm shaft other than the engaged portion. That is, by applying resistance between the engaged portion of the worm shaft and the engagement portion of the gear in the rotational direction with the elastic member, backlash in the rotational direction between the worm shaft and the gear that occurs due to a gap between the engaged portion of the worm shaft and the engagement portion of the gear, and the impact that occurs at the time of contact between the engaged portion of the worm shaft and the engagement of the gear, can be suppressed. As a result it is possible to improve the rotational feel and prevent noise that occurs between the worm shaft and the gear.

Preferably, a retaining groove for retaining the elastic member is disposed in the outer surface of at least one of the boss portion of the gear and the gear locking portion other than the engaged portion. With this arrangement, it is possible to prevent the elastic member from falling off of the outer surfaces of the boss portion and the gear locking portion.

Preferably, the non-circular cross section is a D-cut shape. With this structure, it is possible to suppress backlash between the worm shaft and the gear with a simple configuration.

Preferably, the engaged portion is a pair of opposing planar portions, and the engagement portion of the gear is a slot that engages the pair of opposing planar portions. With this arrangement, it is possible to easily form the engaged portion by machining.

Preferably, the elastic member is an O-ring. With this structure, since the gear locking portion is fastened by the O-ring, even if the diameter of the O-ring is uneven, it is easy to achieve concentricity between the worm shaft and the gear.

According to the present invention, it is possible to improve the rotational feel and prevent noise occurring between the gear and the worm shaft, since it is possible to suppress the backlash between the gear and the worm shaft.

DETAILED DESCRIPTION OF THE INVENTION

First Embodiment

Figure 1:
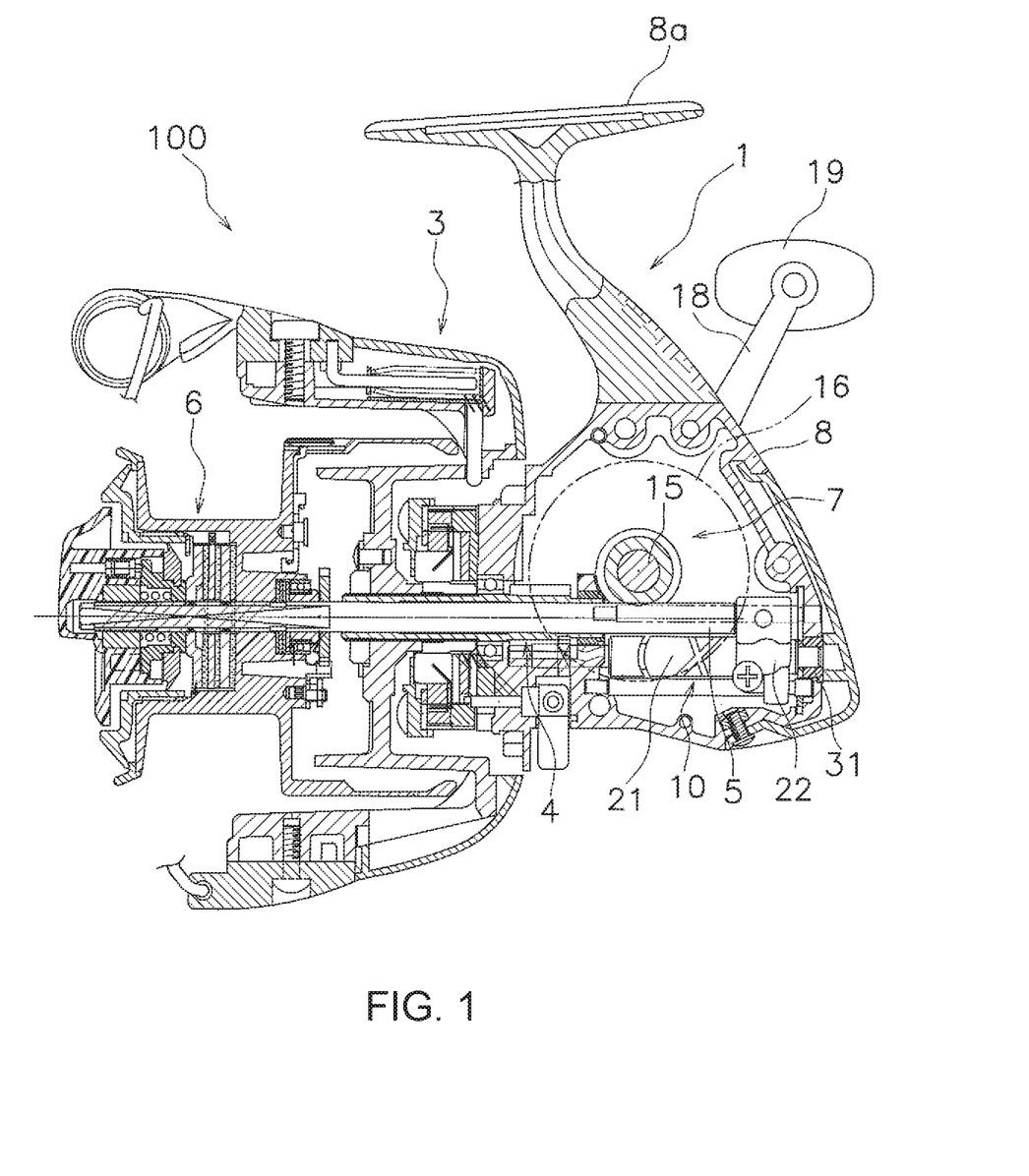
FIG. 1 is a lateral cross-sectional view of a spinning reel according to a first embodiment of the present invention.
Figure 2:
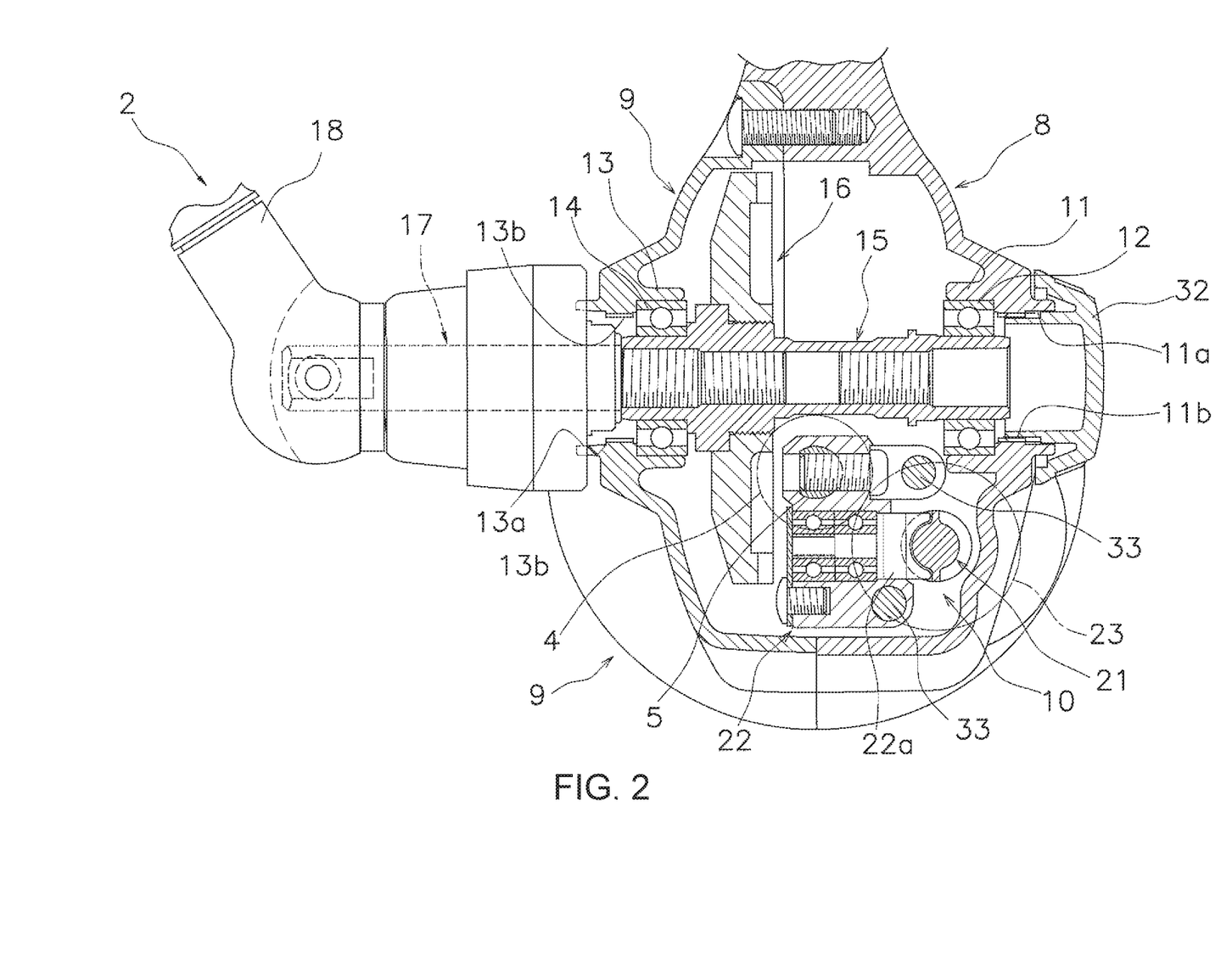
FIG. 2 is a rear cross-sectional view of a spinning reel according to the first embodiment of the present invention.

Embodiments of the gear mounting structure according to the present invention will be explained below, with reference to the drawings. FIG. 1 is a lateral cross-sectional view of a spinning reel, and FIG. 2 is a rear cross-sectional view of the spinning reel. In the following description, "front" indicates the direction in which the fishing line is unreeled (cast); specifically, left in FIG. 1 is the "front."

The spinning reel 100 employing an embodiment of the present invention comprises a reel body 1, a handle assembly 2, a rotor 3, a pinion gear 4, a spool shaft 5, a spool 6, and a drive mechanism 7 having a drive shaft 15, as shown in FIG. 1 and FIG. 2.

As shown in FIG. 2, the reel body 1 comprises a case part 8 and a lid body 9. The lid body 9 is attached to the case part 8 using, for example, a bolt. The reel body 1 comprises an internal space defined by the case part 8 and the lid body 9. The gear mechanism 7, and an oscillating mechanism 10 for evenly winding a fishing line, are housed in the internal space.

The case part 8 comprises a mounting portion 8a that extends in the front-rear direction, and a tubular first boss portion 11. The mounting portion 8a is a portion that is attached to a fishing rod.

The first boss portion 11 comprises a first through-hole 11a for passing through a handle shaft 17, to be described later. A first threaded portion 11b is formed on the inner surface of the first through-hole 11a. A first axle bearing member 12 for supporting one end of the drive shaft 15 is mounted on the inner surface of the first boss portion 11.

The lid body 9 comprises a tubular second boss portion 13. The second boss portion 13 comprises a second through-hole 13a for passing through the handle shaft 17. A second threaded portion 13b is formed on the inner surface of the second through-hole 13a. A second axle bearing member 14 for supporting the other end of the drive shaft 15 is mounted on the inner surface of the second boss portion 13.

The handle assembly 2 comprises a handle shaft 17, a handle arm 18, and a grip portion 19. The handle assembly 2 is rotatably attached to the reel body 1.

The handle shaft 17 extends inside the drive shaft 15. The handle shaft 17 is screwed to the drive shaft 15 and is integrally rotated with the drive shaft 15. The handle shaft 17 extends inside the second through-hole 13a.

The handle arm 18 is disposed on the lid body 9 side of the reel body 1. One end of the handle arm 18 is connected to the handle shaft 17. As shown in FIG. 1, the grip portion 19 is rotatably attached to the other end of the handle arm 18.

Here, as shown in FIG. 2, the handle assembly 2 is disposed on the lid body 9 side of the reel body 1, but may also be mounted on the case portion 8 side, and the first through-hole 11a to which the handle assembly 2 is not attached is closed by a cap member 32.

The rotor 3 is a member for winding the fishing line onto the spool 6. The rotor 3 is fixed to the front portion of the pinion gear 4, and is integrally rotated with the pinion gear 4.

The pinion gear 4 is disposed on the reel body 1. In particular, the pinion gear 4 is formed in a tubular shape, and extends forward from the reel body 1. The spool shaft 5 extends inside of the pinion gear 4. Meanwhile, the pinion gear 4 is supported on the reel body 1 via a plurality of axle bearing members (not shown).

The spool shaft 5 is disposed on the reel body 1. In particular, the spool shaft 5 extends forward from inside the reel body 1.

The spool 6 is a member onto which a fishing line is wound. The spool 6 is integrally reciprocated with the spool shaft 5 in the front-rear direction.

As shown in FIG. 2, the drive mechanism 7 is formed by a tubular drive shaft 15 and a drive gear 16. Both ends of the drive shaft 15 are rotatably supported on the reel body 1 by first and second axle bearing members 12, 14.

The drive gear 16 is coupled to the drive shaft 15 and is integrally rotated with the drive shaft 15. In particular, the drive shaft 15 and the drive gear 16 are formed from one member. The drive gear 16 is a face gear, and meshes with the pinion gear 4. The drive shaft 15 and the drive gear 16 are rotated by rotating the handle assembly 2 attached to the reel body 1, and the pinion gear 4 is also rotated. Accompanying the rotation of this pinion gear 4, the oscillating mechanism 10 reciprocates the spool shaft 5 in the front-rear direction.

Figure 3:
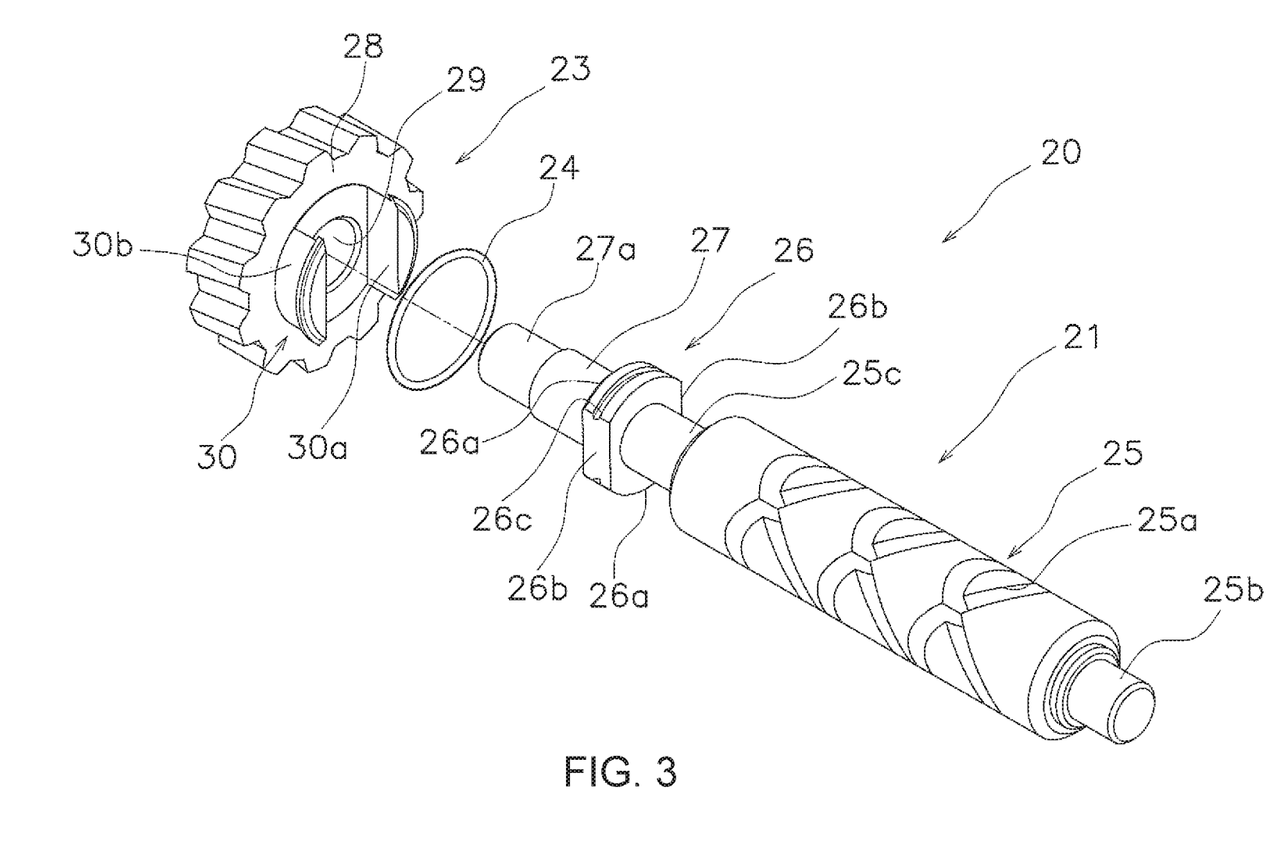
FIG. 3 is an exploded perspective view of the gear mounting structure.

As shown in FIG. 2 and FIG. 3, the oscillating mechanism 10 comprises a worm shaft 21, a slider 22, a gear 23, and an elastic member 24. The gear mounting structure 20 according to one embodiment of the present invention is formed from the worm shaft 21, the gear 23, and the elastic member 24, which are a part of the oscillating mechanism 10.

As shown in FIG. 3, the worm shaft 21 comprises a shaft body 25, a gear locking portion 26, and a gear supporting portion 27. The shaft body 25 is a large-diameter portion of the worm shaft 21, on the outer surface of which are formed intersecting spiral grooves 25a. A first supporting portion 25b, having a smaller diameter than the outer diameter of the shaft body 25, is formed at the rear end (right end in FIG. 1) of the shaft body 25. The first supporting portion 25b is rotatably supported by an axle bearing member 31 (refer to FIG. 1) disposed on the rear portion of the reel body 1.

A connecting portion 25c that connects the shaft body 25 and the gear locking portion 26 is formed at the front end of the shaft body 25. The outer diameter of the connecting portion 25c is smaller than the outer diameter of the shaft body 25.

The gear locking portion 26 locks the gear 23 so as to be integrally rotatable with the worm shaft 21. The gear locking portion 26 has substantially the same diameter as the shaft body 25. The gear locking portion 26 comprises a pair of curved surface portions 26a arranged opposite to each other, and a pair of opposing planar portions 26b (one example of an engaged portion) that are connected to the ends of the curved surface portions 26a. Therefore, the cross section of the gear locking portion 26 is non-circular.

The outer diameter of the curved surface portions 26a is substantially the same as the outer diameter of the shaft body 25, and is formed coaxially with the axial center of the worm shaft 21. First retaining grooves 26c for retaining the elastic member 24 are disposed in the outer surface of the curved surface portions 26a. The first retaining grooves 26c are formed so as to traverse the outer surface of the curved surface portions 26a in the circumferential direction.

The planar portions 26b are formed by cutting the circular outer perimeter surface in parallel by a cutting process, and are disposed radially outwardly of the gear supporting portion 27. Therefore, in the present embodiment, the planar portions 26b and the curved surface portions 26a of the gear locking portion 26 are respectively disposed opposing each other in radial positions beyond the gear supporting portion 27.

The gear supporting portion 27 has a circular cross section, and is disposed on the front end side of the shaft body 25 with the gear locking portion 26 interposed therebetween. The outer diameter of the gear supporting portion 27 is smaller than the outer diameter of the gear locking portion 26. A second supporting portion 27a is formed at the front end of the gear supporting portion 27. The second supporting portion 27a is rotatably supported by an axle bearing member, which is not shown, disposed in the front portion of the reel body 1. The outer diameter of the second supporting portion 27a is smaller than the outer diameter of the gear supporting portion 27.

The slider 22 is movably supported by two guide shafts 33 (refer to FIG. 2), disposed in parallel with the worm shaft 21. Further, as shown in FIG. 2, an engagement member 22a engaging the spiral grooves 25a of the worm shaft 21 is mounted inside the slider 22. The slider 22 is reciprocated in the front-rear direction accompanying the rotation of the worm shaft 21, by the engagement member 22a being engaged with the spiral grooves 25a.

As shown in FIG. 3, the gear 23 comprises a body portion 28, a centering portion 29, and a boss portion 30. Teeth that mesh with the pinion gear 4 are formed on the outer perimeter of the gear body 28. The rotation of the handle assembly 2 is thereby transmitted to the gear body 28.

The centering portion 29 is formed on the inner surface of the gear 23, and is fitted to the gear supporting portion 27 so as to be centered with respect to the worm shaft 21.

The boss portion 30 protrudes rearwardly from an end surface of the gear body 28. The boss portion 30 comprises an engagement portion 30a and a second retaining groove 30b. The engagement portion 30a has a slot shape, and is formed so as to traverse the boss portion 30. The engagement portion 30a is formed with high precision by simple machining using a T slot tool or a milling tool. This slot-shaped engagement portion 30a engages the planar portions 26b of the gear locking portion 26, such that the gear 23 is integrally rotatable with the worm shaft 21.

The second retaining groove 30b retains the elastic member 24, and is formed on the outer surface of the boss portion 30. In particular, the second retaining groove 30b is recessed radially inwardly from the outer surface of the boss portion 30. Then, in a state in which the worm shaft 21 and the gear 23 are assembled, the second retaining groove 30b is aligned with the first retaining groove 26c of the gear locking portion 26 in the axial direction.

Figure 4:
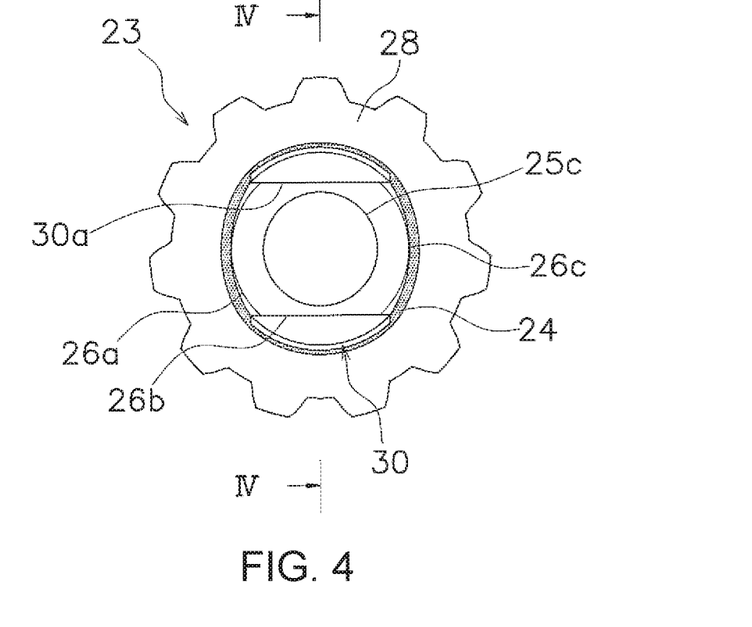
FIG. 4 is a rear view when an elastic member is mounted in the first and second retaining grooves.
Figure 5:
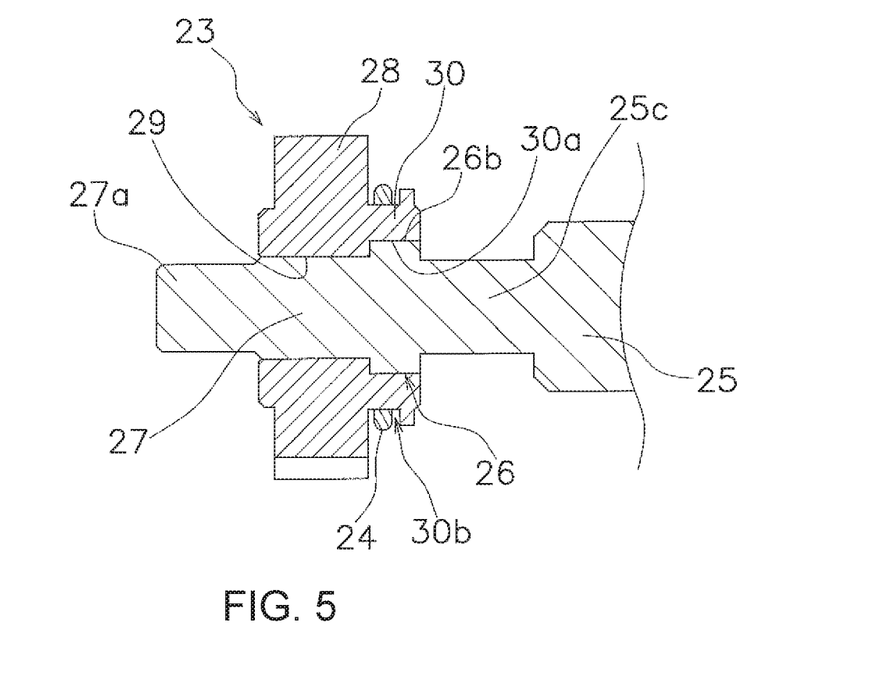
FIG. 5 is a cross-sectional view taken along line IV-IV of FIG. 4.

The elastic member 24 is a body made of an elastically deformable resin, or the like, for example an O-ring. As shown in FIG. 4 and FIG. 5, the elastic member 24 is mounted in the first retaining groove 26c of the gear locking portion 26 and the second retaining groove 30b of the boss portion 30, and is retained on the outer perimeter of the boss portion 30. In this state, the elastic member 24 will be disposed abutting a portion of the curved surface portion 26a of the gear locking portion 26 and the outer perimeter of the boss portion 30.

In this manner, by disposing the elastic member 24 abutting a portion of the curved surface portion 26a of the gear locking portion 26 and the outer surface of the boss portion 30, the gear locking portion 26 is fastened by the elastic member 24. Since it is thereby possible to suppress the backlash between the gear 23 and the worm shaft 21, it is possible to improve the rotational feel and prevent noise from occurring between the gear 23 and the worm shaft 21.

In addition, by using an O-ring for the elastic member 24, even if the diameter of the O-ring is uneven, since the gear locking portion 26 is fastened by the O-ring, it is easy to achieve concentricity between the worm shaft 21 and the gear 23.

Modified Example of the First Embodiment

Figure 6:
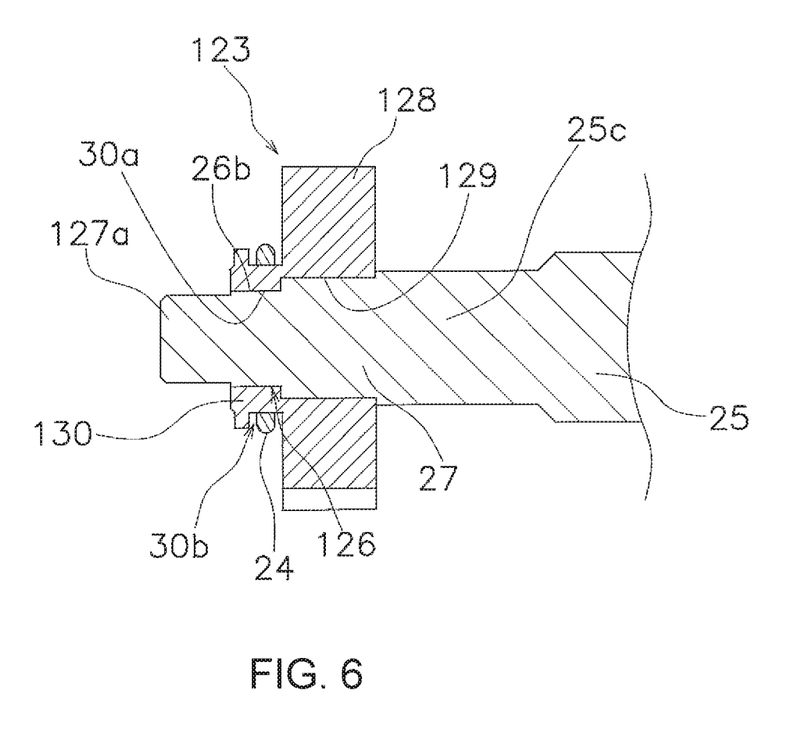
FIG. 6 is a cross-sectional view of a portion of a gear mounting structure according to a modified example of the gear mounting structure.

In the first embodiment, the boss portion 30 of the gear 23 protrudes rearwardly from an end surface of the gear body 28; however, in a gear mounting structure according to a modified example of the first embodiment, a boss portion 130 of a gear 123 protrudes forwardly from an end surface of a body portion 128, as shown in FIG. 6. A gear locking portion 126 is disposed between a second supporting portion 127a and a centering portion 129. The other configurations are the same as in the first embodiment.

Second Embodiment

Figure 7:
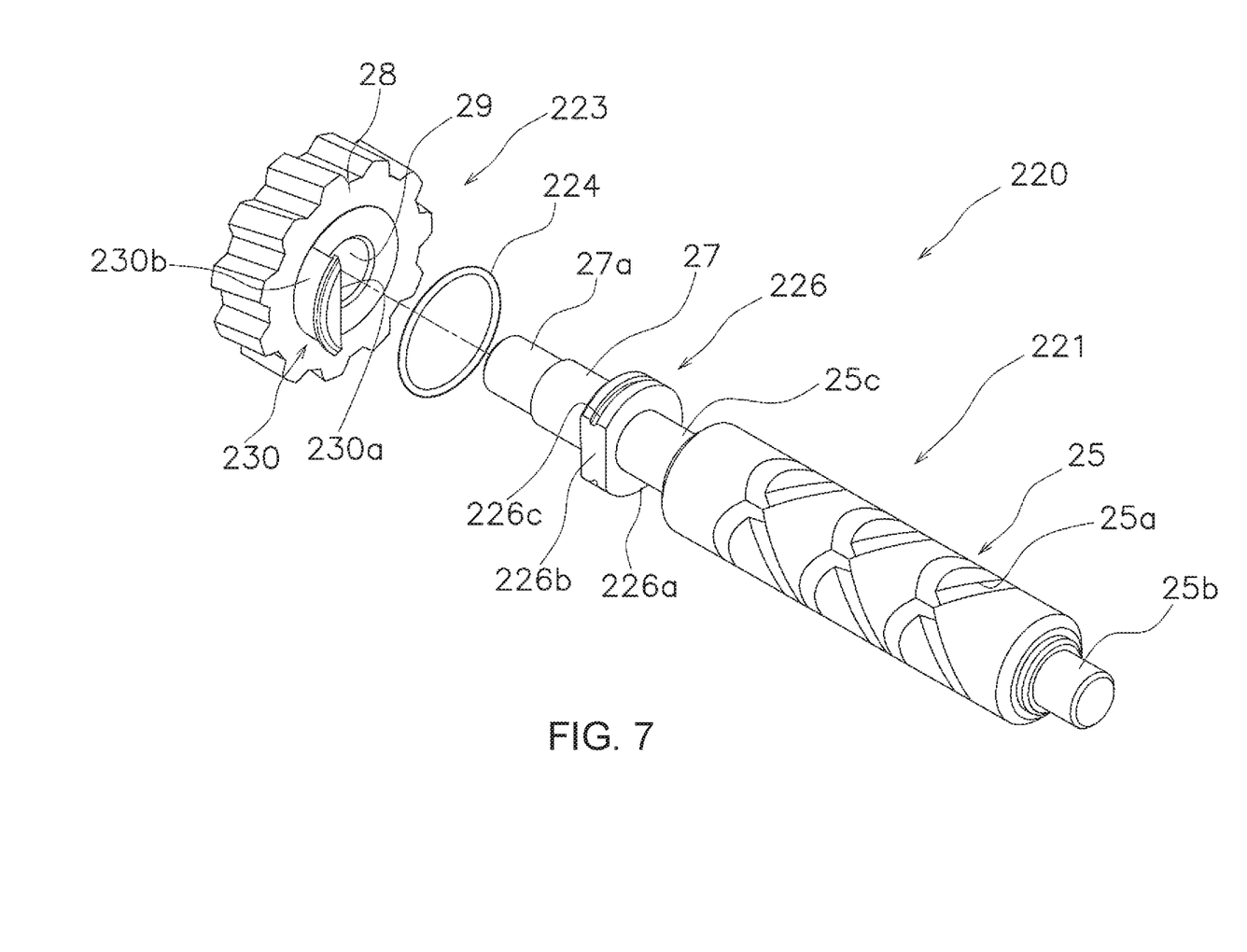
FIG. 7 is a view corresponding to FIG. 3 according to a second embodiment.

FIG. 7 is a gear mounting structure 220 according to a second embodiment. The gear mounting structure 220 is different from the first embodiment in the shapes of the planar portion 226b (one example of an engaged portion) of the worm shaft 221 and of the engagement portion 230a of the gear 223. Since the other configurations are the same as the first embodiment, the descriptions thereof are omitted.

Figure 8:
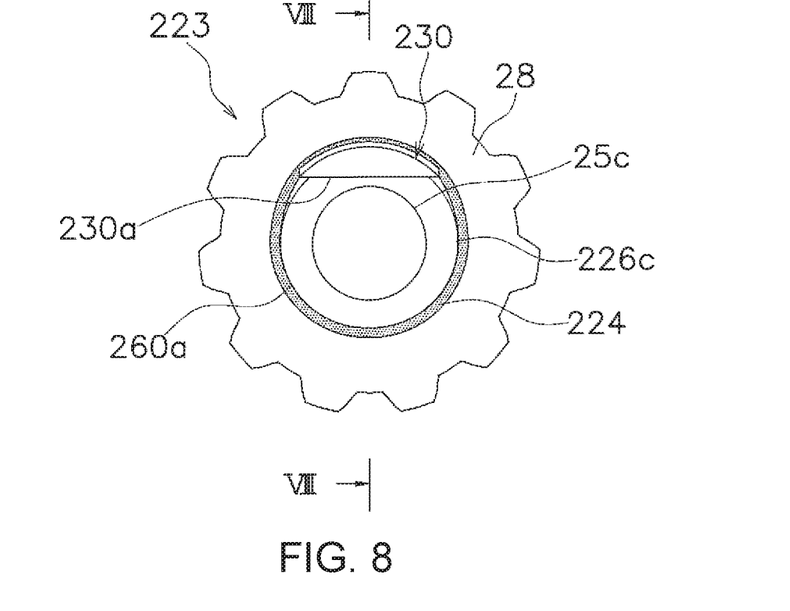
FIG. 8 is a view corresponding to FIG. 4 according to the second embodiment.

In the first embodiment, two surfaces comprising a pair of planar portions 26b of the gear locking portion 26 are engaged with the engagement portion 30a; however, in the gear mounting structure 220 according to the second embodiment, one planar portion 226b and one engagement portion 230a are engaged, as shown in FIG. 7 and FIG. 8.

The planar portion 226b is formed in a flat shape in at least a portion of the outer surface. The planar portion 226b forms a non-circular cross section, here D-cut shape. That is, the gear locking portion 226 comprises one planar portion 226b, and one curved surface portion 226a that is connected to the two ends of the planar portion 226b. A first retaining groove 226c is formed in the curved surface portion 226a, so as to traverse the outer curved surface portion 226a in the circumferential direction.

The boss portion 230 of the gear 223 protrudes rearwardly from an end surface of the gear 223. An engagement portion 230a, engaged with the planar portion 226b, is formed on the boss portion 230, and a second retaining groove 230b is formed on the outer surface. The boss portion 230 is substantially disposed only on the portion that opposes the planar portion 226d. Then, in a state in which the worm shaft 221 and the gear 223 are assembled, the second retaining groove 230b is aligned with the first retaining groove 226c of the gear locking portion 226 in the axial direction.

Figure 9:
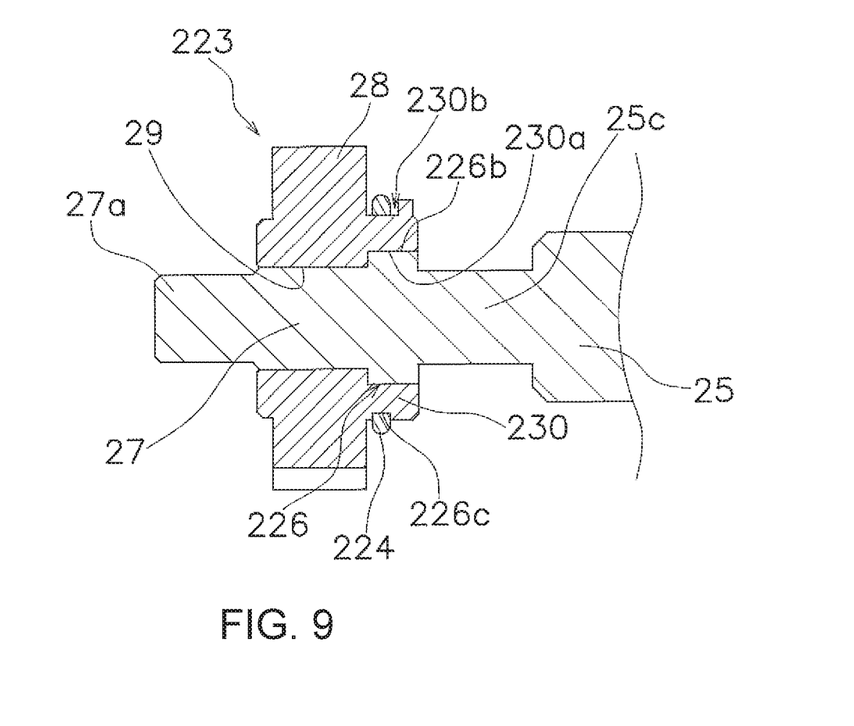
FIG. 9 is a view corresponding to FIG. 5 according to the second embodiment.

As shown in FIG. 8 and FIG. 9, the elastic member 224 is mounted in the first retaining groove 226c of the gear locking portion 226 and the second retaining groove 230b of the boss portion 230. Since the gear locking portion 226 is thereby fastened by the elastic member 224 disposed abutting a portion of the curved surface portion 226a of the gear locking portion 226 and the outer perimeter of the boss portion 230, it is possible to suppress the backlash between the worm shaft 221 and the gear 223. Furthermore, it is possible to improve the rotational feel and prevent noise from occurring between the worm shaft 221 and the gear 223.

Modified Example of the Second Embodiment

Figure 10:
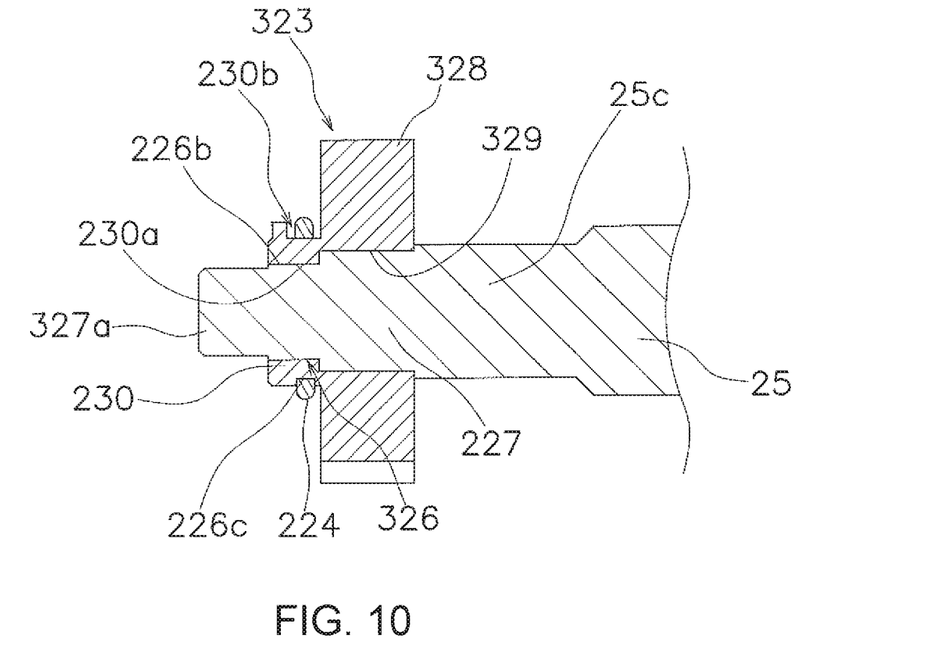
FIG. 10 is a view corresponding to FIG. 6 according to a modified example of the second embodiment.

As shown in FIG. 10, in the gear mounting structure according to a modified example of the second embodiment, boss portion 330 of gear 323 protrudes forwardly from an end surface of a body portion 328. Further, in the same manner as the modified example of the first embodiment, a gear locking portion 326 is disposed between a second supporting portion 327*a* and a centering portion 329. The other configurations are the same as in the first embodiment.

Other Embodiments

The present invention is not limited to the above-described embodiments, and various modifications and adjustments are possible. Especially, the various embodiments and modified examples described in the present Specification can be freely combined according to necessity.

In the above-described embodiments, an oscillating mechanism of a spinning reel was shown as an example of a reciprocating mechanism for a fishing reel, but the present invention is not limited thereto. For example, the present invention may be applied to a level winding mechanism of a dual-bearing reel and an oscillating mechanism of a spin cast reel.

In the above-described embodiments, the gear directly meshes with the pinion gear, but the present invention may be applied to a configuration in which the gear meshes with the pinion gear via a speed reducing mechanism.

In the above-described embodiments, one or a pair of each of planar portions and curved surface portions were disposed on the gear locking portion; however, it is sufficient if there is at least one of a planar portion and a curved surface portion is present. For example, it may be configured such that a planar portion and an engagement portion are engaged on three surfaces.

In the above-described embodiments, a first retaining groove was formed traversing the outer curved surface portion in the circumferential direction, but the first retaining groove may be disposed only in the portion that is abutted by the elastic member.

In the above-described embodiments, the portions other than the planar portion (one example of an engaged portion) of the gear locking portion were formed by curved surface portions; however, the portions other than the planar portion (one example of an engaged portion) of the gear locking portion may be formed in a flat shape, and an elastic member may be mounted so as to be able to abut the one portion.

What is claimed is:

1. A gear mounting structure used in a reciprocating mechanism of a fishing reel, and to which rotation of a handle is transmitted, the gear mounting structure comprising:
   a worm shaft having a shaft body, and a gear locking portion with a non-circular cross section, the shaft body having intersecting spiral grooves disposed on an outer perimeter surface thereof, and the gear locking portion having a planar engaged portion disposed on at least a portion of an outer surface thereof;
   a gear having a gear body to which the rotation of the handle is transmitted, and a boss portion protruding from the gear body, the gear body having teeth disposed on an outer surface thereof, and the boss portion having an engagement portion engaging the engaged portion of the gear locking portion; and
   an elastic member mounted so as to engage at least a portion of an outer surface of the boss portion of the gear, and at least a portion of an outer surface of the gear locking portion other than the engaged portion.

2. The gear mounting structure according to claim 1, wherein
   a retaining groove configured to retain the elastic member is disposed in the outer surface of at least one of the boss portion of the gear and the gear locking portion other than the engaged portion.

3. The gear mounting structure according to claim 1, wherein
   the non-circular cross section is a D-cut shape.

4. The gear mounting structure according to claim 1, wherein
   the engaged portion is a pair of opposing planar portions, and
   the engagement portion of the gear is a slot engaged with the pair of opposing planar portions.

5. A gear mounting structure used in a reciprocating mechanism of a fishing reel, and to which rotation of a handle is transmitted, the gear mounting structure comprising:
   a worm shaft having a shaft body, and a gear locking portion with a non-circular cross section, the shaft body having intersecting spiral grooves disposed on an outer perimeter surface thereof, and the gear locking portion having a planar engaged portion disposed on at least a portion of an outer surface thereof;
   a gear having a gear body to which the rotation of the handle is transmitted, and a boss portion protruding from the gear body, the gear body having teeth disposed on an outer surface thereof, and the boss portion having an engagement portion engaging the engaged portion of the gear locking portion; and
   an elastic member mounted so as to abut an outer surface of the boss portion of the gear, and at least a portion of the gear locking portion other than the engaged portion, the elastic member being an O-ring.

\* \* \* \* \*